March 12, 1935.  J. F. G. CHOBERT  1,994,210
METHOD OF CONNECTING HOLLOW BODIES
Filed June 30, 1933
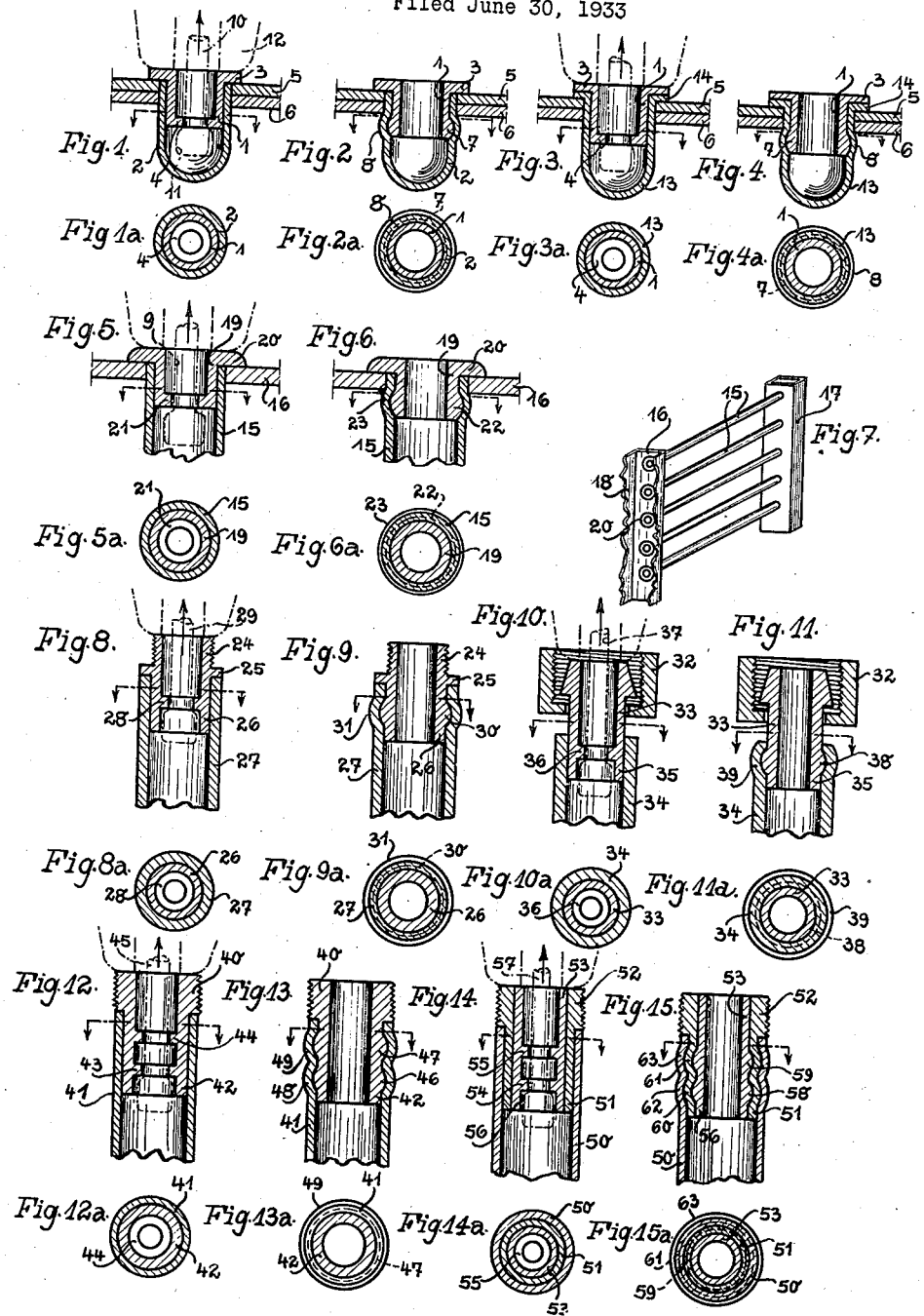

Patented Mar. 12, 1935

1,994,210

UNITED STATES PATENT OFFICE 1,994,210

METHOD OF CONNECTING HOLLOW BODIES

Jacques Francois Gabriel Chobert, Saint-Etienne, France

Application June 30, 1933, Serial No. 678,371 In France July 5, 1932

8 Claims. (Cl. 29—148.2)

My invention relates to the art of connecting two hollow bodies inserted one within the other, and more particularly to a method of producing a tight connection of smooth-walled inner and outer hollow bodies which will remain tight under high internal pressures. The method according to this invention is especially suitable for fitting pipe nipples, connecting elements and the like on pipe ends, for the production of tight rivetings by means of hollow rivets for inserting pipes in plates, such as employed for example in radiators, and is generally intended to produce such hollow connections, the hollow space of which is accessible only from one side.

The novel feature of the method according to the present invention consists in that the inner one of the two hollow bodies inserted one within the other has inwardly projecting thickened portions, which are transformed by applying pressure into an outwardly projecting collar, or the like, whereby the wall of the outer hollow body is correspondingly expanded. This new method presents the advantage that additional auxiliary elements can be dispensed with for producing the connection, that the wall thickness of the two hollow bodies to be connected is not weakened at any point, and that the outwardly pressed thickened portion of the inner hollow body is pressed tightly into the wall of the outer hollow body expanding the same. Because of the forcible outward pressing of the inwardly projecting thickened portion of the inner hollow body, to which the outer hollow body tightly surrounding same offers resistance, the structure of the material forming said thickened portion is structurally changed by pressure and is hardened by cold means so that it has a different coefficient of expansion from the material of the hollow body which remains unchanged. The connection becomes thus insensitive to variations in temperature, and even in the case of relatively thin-walled soft material is capable of resisting inner pressure. The method according to this invention is, therefore, particularly suitable for relatively thin-walled narrow pipe- or similar connections, such as are employed for example in aircraft construction and which, besides being of light weight must be particularly proof against rupture and vibrations. It is also possible to produce tight connections by means of hollow rivets, which is particularly important for the closing seam of vessels closed on all sides, in which solid rivets cannot be inserted because the vessel is not accessible from the interior.

The thickened portions may be in the shape of an inwardly projecting ring or the like, and several such rings in superposed relation may be provided. In the case of connecting nipples, or similar extensions with tubular ends, it is sufficient for the thickened portions to be disposed on an insert sleeve slipped into the inner hollow body, so that the method according to this invention can be also employed for ordinary commercial nipples smooth on their inner side.

Several embodiments of connections made by the method in accordance with the present invention are shown by way of example in the accompanying drawing in which:—

Figs. 1 and 2, and 1a and 2a show in longitudinal section and cross section on lines a—a respectively the connection of two plates by a hollow rivet with packing by an insert cap.

Figs. 3 and 4, and 3a and 4a show in longitudinal section and in cross section on lines a—a respectively a connection corresponding to Figs. 1 and 2 with insert cap of modified shape.

Figs. 5 and 6 and 5a and 6a show in longitudinal section and in cross section on lines a—a respectively a connection between a plate and a pipe length, such as employed for a radiator illustrated in Fig. 7 in perspective view.

Figs. 8 and 9 and 8a and 9a show in longitudinal section and in cross section on lines a—a respectively a connection between a screw nipple and a pipe end.

Figs. 10 and 11, and 10a and 11a show in longitudinal section and in cross section on lines a—a respectively the employment on a nipple with cap nut.

Figs. 12 and 13 and 12a and 13a show in longitudinal section and in cross section on lines a—a respectively a screw nipple inserted in a pipe length with two superposed thickenings.

Figs. 14 and 15 and 14a and 15a show in longitudinal section and cross section respectively the application on a nipple with smooth inner wall in conjunction with an insert sleeve provided with thickenings.

In the rivet connection illustrated in Figs. 1 and 2 the inner one of the hollow bodies to be connected is a hollow rivet 1, whereas the outer hollow body is an insert cap 2. The hollow rivet 1 has at one end in the usual manner an outwardly extending flange 3 and at the other end an inwardly projecting centrally bored collar 4 forming a thickening of the material. The two hollow bodies 1 and 2 serve the purpose of tightly connecting two plates 5 and 6 which form two boundary walls of a vessel closed on all sides and are to be connected by rivets. The employment of the method according to this invention, besides forming a tight connection between the hollow rivet 1 and the insert cap 2, also presents the advantage that at the same time the rivet hole is sealed by the cap 2.

In the practice of the method the insert cap 2 lining the rivet hole is inserted therein and the hollow rivet 1 is then placed in the cap 2 so that the inner collar 4 lies in the cap whereas the outer flange 3 rests on the plate 5. The inner collar 4 forming the thickening is then transformed, by application of pressure, into an outwardly projecting collar 7 on the hollow rivet as shown by Fig. 2. Thus, the insert cap 2, in conforming to said collar 7, will be bulged so as to form a bead 8 bearing against the plate 6. The transformation of the hollow rivet 1 may be effected by a setting mandrel 10 (shown in dot-dash lines in Fig. 1), on the shank of which the hollow rivet 1 is placed so that the driver head 11 projects beyond the rivet 1, the inwardly projecting collar 4 of which rests on the head 11 before the hollow rivet is slipped into the cap. A dolly 12 (shown in dot-dash lines in Fig. 1) bearing against the outer flange 3 of the rivet 1 acts as counter bearing of the rivet 1 and holds the rivet in the rivet hole during the forcible removal of the setting mandrel 10 in the direction of the arrow. By the pulling out of the setting mandrel 10, the inner collar 4 of the hollow rivet 1 is displaced in outward direction. The material forming this collar 4 is thus upset, changes its structure and, after the transformation into the outwardly projecting collar 7 (Fig. 2), forms with the annular bead 8 produced on the cap 2 a rigid and tight connection between the two elements 1 and 2.

In the example illustrated by Figs. 3 and 4 the insert cap 13 has an outwardly bent flange 14 which bears on the plate 5 around the rivet hole and prevents the cap 13 from dropping through the rivet hole when being inserted therein.

Figs. 5 and 6 show a method of inserting pipes in plates as employed for example in radiators shown in Fig. 7. The outer hollow body is in this instance formed by a pipe 15 one end of which is inserted in a hole in a wall 16 of the supply or discharge body 17, 18 (Fig. 7) and accommodates a hollow rivet 19. The outwardly directed flange 20 of the hollow rivet 19 bears against the side of the plate 16 remote from the pipe 15 and has on its other end an inwardly projecting collar 21 forming a thickening. The individual elements are inserted the one within the other in the manner illustrated in Fig. 5 and the collar 21 is then transformed into an outwardly projecting bead 22 (Fig. 6) by a driver or setting mandrel 9 shown in dot-dash lines in Fig. 5 in a similar manner to that described in connection with Figs. 1 to 4. Thus, the pipe 15, conforming the bead 22, is upset in bead-shape, and a rigid and tight connection is established between the elements 15 and 20. The length of the hollow rivet 20 is so chosen that the bulge 23 (Fig. 6) formed on the pipe 15 bears against the under side of the plate 16 (Fig. 6) thus sealing the connection between the plate 16 and the pipe 15.

Figs. 8 to 15 show the carrying out of the method when nipples are inserted in pipe ends. In the example illustrated in Figs. 8 and 9 a screw nipple 24 is employed, the smooth shank 26 of which is inserted in a pipe 27, until its outer flange 25 bears against the pipe end. The shank 26 projecting into the pipe 27 has a collar 28 projecting from the inner wall and forming a narrowing of the passage prior to the transformation of the nipple 24 (Fig. 8). This collar 28 is transformed into a bead 30 (Fig. 9) by means of a driver 29 (shown in dot-dash lines in Fig. 8). By this transformation, the pipe is bulged at the place of the bead 30 and thus holds the nipple 24 rigidly and tightly surrounded, the bead bulge 31 of the pipe 27 preventing the pulling off of the transformed nipple 24.

The embodiment shown in Figs. 10 and 11 relates to the fixing on a pipe 34 of a nipple 33 provided with a cap nut 32. The smooth shank 35 of the nipple 33 projecting into the end of the pipe 34 has an inwardly projecting collar bulge 36 which is transformed into a bead 38 (Fig. 11) by means of a driver 37 (shown in dot-dash lines in Fig. 10) and thereby upsets the pipe 34 smoothly surrounding the nipple, so as to form a bulge 39 (Fig. 11).

Figs. 12 and 13, like Figs. 8 and 9, show a connection between a screw nipple 40 and a pipe 41. The nipple 40 has on its shank portion 42 extending into the pipe 41 two superposed inwardly projecting collars 43, 44, which are successively transformed into beads 46, 47 (Fig. 13) in the manner described in connection with the foregoing figures on the drawing, by means of a driver 45 (shown in dot-dash lines in Fig. 12), the pipe 41 being expanded in forming two bulging portions 48, 49 (Fig. 13), a rigid and tight connection between the nipple 40 and the pipe 41 being thus produced.

The method is of course not restricted to the employment of the special constructional elements with one or more inwardly projecting collars which form the thickening of the material but can be also used for ordinary screw nipples with a smooth inner wall. The thickenings necessary for carrying out the method according to the invention are then provided by separate insert sleeves which are introduced into the screw nipple, as shown in the embodiment according to Figs. 14 and 15. These figures show the connection of a smooth walled tube with a shank portion 51 of a likewise smooth walled screw nipple 52 inserted in the pipe end. For producing the connection, an insert sleeve 53 is introduced in the nipple 52 and bears against the inner wall thereof, which sleeve in the embodiment shown is provided with two superposed inwardly projecting collars 54, 55 (Fig. 14) on the shank portion 56 surrounded by the pipe 50. The two collars 54, 55 are transformed into two beads 58, 59 by a driver 57 thickened at its end (shown in dot-dash lines in Fig. 14) being pulled through. By this transformation two bulges 60, 61 and 62, 63 respectively (Fig. 15) are produced on the nipple 52 and on the pipe 50 surrounding same, which bulges in conjunction with the beads 58, 59 of the sleeve 53 form a rigid and tight connection between the nipple 52 and the pipe 50.

A point which is of primary importance in this invention is, that thickened portions of the material serve the purpose of producing the connection, which thickened portions are outwardly displaced from the inside, and that none of the hollow bodies to be connected have weakened walls at the points to be connected either before or after the transformation. The practice of the method according to this invention is not limited to the employment of a driver or setting mandrel as described, but any other tool may be employed which is capable of outwardly displacing a thickening inwardly projecting into a hollow body, without causing the thickened material to creep along said hollow body.

I claim:—

1. The method of connecting smooth-walled closely fitting inner and outer tubular bodies accessible from one end only, which comprises providing on the interior of the inner hollow body inwardly projecting portions and forcibly outwardly displacing said portions so as to produce on the exterior of said inner hollow body a bead-like projection and thereby in the outer hollow body a corresponding inner recess held in fluid-tight engagement with said projection and causing an outward bulge in said outer hollow body.

2. The method of connecting smooth-walled closely fitting inner and outer tubular bodies accessible from one end only, which comprises providing on the interior of the inner hollow body inwardly projecting portions and forcibly outwardly displacing said portions by upsetting the same so as to produce on the exterior of said inner hollow body a bead-like projection and thereby in the outer hollow body a corresponding inner recess held in fluid-tight engagement with said projection and causing an outward bulge in said outer hollow body.

3. The method of producing a tight rivet connection, which comprises placing in a rivet hole of an outer body a hollow body, inserting into the latter a hollow rivet having inwardly projecting portions, and forcibly outwardly displacing said portions so as to produce on the exterior of said hollow rivet a bead-like projection and thereby in said hollow body a corresponding inner recess conforming to said bead-like projection and held in fluid-tight engagement therewith, said inner recess causing an outward bulge.

4. The method of producing a tight rivet connection which comprises placing in a rivet hole of an outer body a bell-shaped hollow body, inserting into the latter a hollow rivet having inwardly projecting portions, and forcibly outwardly displacing said portions so as to produce on the exterior of said hollow rivet a bead-like projection and thereby in said hollow body a corresponding inner recess conforming to said bead-like projection and held in fluid-tight engagement therewith, said inner recess causing an outward bulge.

5. The method of producing a tight rivet connection which comprises placing in a rivet hole of an outer body a hollow body having an outwardly extending flange, inserting in said hollow body a hollow rivet provided with inwardly projecting portions, and forcibly outwardly displacing said portions so as to produce on the exterior of said hollow rivet a bead-like projection and thereby in said hollow body a corresponding inner recess conforming to said bead-like projection and held in fluid-tight engagement therewith, said inner recess causing an outward bulge.

6. The method of tightly connecting smooth-walled closely fitting inner and outer hollow bodies accessible from one end only, which comprises providing on the inner hollow body at different places inwardly projecting portions, and forcibly outwardly displacing said portions so as to produce on the exterior of said inner hollow body enlargements and thereby in the opposed portions of the wall of the outer hollow body corresponding inner recesses corresponding in shape to said bead-like enlargements and held in fluid-tight engagement therewith, said inner recesses causing outward bulges.

7. The method of tightly connecting smooth-walled closely fitting inner and outer hollow bodies accessible from one end only which comprises introducing into the inner hollow body a sleeve having inwardly projecting portions, and forcibly outwardly displacing said portions so as to produce on the exterior of said sleeve bead-like enlargements and thereby in the opposed portions of the walls of the inner and outer hollow bodies correspondingly shaped bulges conforming to said bead-like enlargements held in fluid-tight engagement therewith.

8. The method of tightly connecting smooth-walled closely fitting inner and outer hollow bodies which comprises providing in the inner hollow body inwardly projecting portions, and forcibly outwardly displacing said portions so as to produce on the exterior of said inner hollow body bead-like enlargements, forcing the same against the opposed portions of the wall of the outer hollow body causing therein corresponding recesses resulting in outwardly bulging portions conforming to said bead-like projections and held in fluid-tight engagement therewith.

JACQUES FRANCOIS GABRIEL CHOBERT.